May 13, 1930. S. SAUL 1,758,625
AIR VALVE FOR INFLATING HOLLOW BODIES
Filed Dec. 14, 1928

Inventor
Siegfried Saul

Patented May 13, 1930

1,758,625

UNITED STATES PATENT OFFICE

SIEGFRIED SAUL, OF AACHEN, GERMANY

AIR VALVE FOR INFLATING HOLLOW BODIES

Application filed December 14, 1928, Serial No. 326,087, and in Germany October 20, 1928.

This invention relates to an air valve for inflating hollow bodies specially bladders for foot balls. The air valve, according to the invention, is distinguished from air valves of known type by its simple construction and by its absolutely reliable effect.

The invention consists essentially in that a hood-shaped element of convenient material serving as valve case, the envelope and eventually also the bottom of said element having one or more openings, extends with its bottom and envelope to underneath the charging hole of the hollow body into this hollow body, the flange at the upper end of the valve case being tightly fixed on the hollow body, a ring of hard rubber or other suitable material serving as valve seat being tightly fitted in said valve case and eventually also fixed on said hollow body, and a hood-shaped element of soft rubber serving as valve body and having also openings in its envelope, the outer diameter of said valve body being smaller than the inner diameter of the valve case and said valve body, being slightly higher than the distance between the valve seat and the bottom of the valve case, resting tightly with its rim on the bottom of the valve case so that its top end presses strongly against the valve seat and automatically packs the same.

As the packing faces of the valve body and of the valve seat may be comparatively large, a very effective packing is obtained in the valve according to the invention. The packing faces of the valve body and of the valve seat may be plane, curved, conical or of any other suitable form.

The material for the valve case is selected according to the object for which the valve is designed. The valve case might be made for instance of aluminium or of any other metal. The openings in the envelope of the valve body and in the bottom of the valve case might be omitted if desired.

At the filling of the hollow body with compressed air the valve body is slightly compressed by this compressed air so that its top moves away from the valve seat, and compressed air can flow through between the valve seat and the valve body through the openings of the valve case and eventually through the openings of the valve body into said hollow body.

As soon as the charging is interrupted, the top end of the valve body bears automatically against the valve seat and shuts off the same tightly. By the increasing air pressure the valve body is more strongly pressed against the valve seat, and the packing of this valve seat is increased accordingly.

If the compressed air has to be discharged from the hollow body, the valve body is slightly pushed back by means of a rod inserted through the charging opening of the hollow body and through the central boring of the valve seat, so that the compressed air in the hollow body can escape into the atmosphere between the valve body and the valve seat. In order to prevent the rod slipping between valve seat and valve body, an indentation is preferably arranged in the packing surface of the valve body, designed to receive the accordingly shaped end of the rod used to open the valve.

An embodiment of the invention consisting of an air valve for inflating the bladder of a foot ball, is illustrated by way of example in the accompanying drawing in which:—

Figure 1:
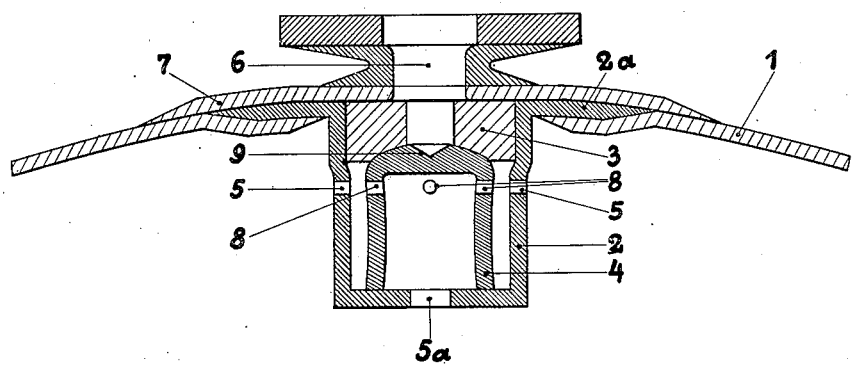
Fig. 1 shows the air valve in longitudinal section in the closing position.
Figure 2:
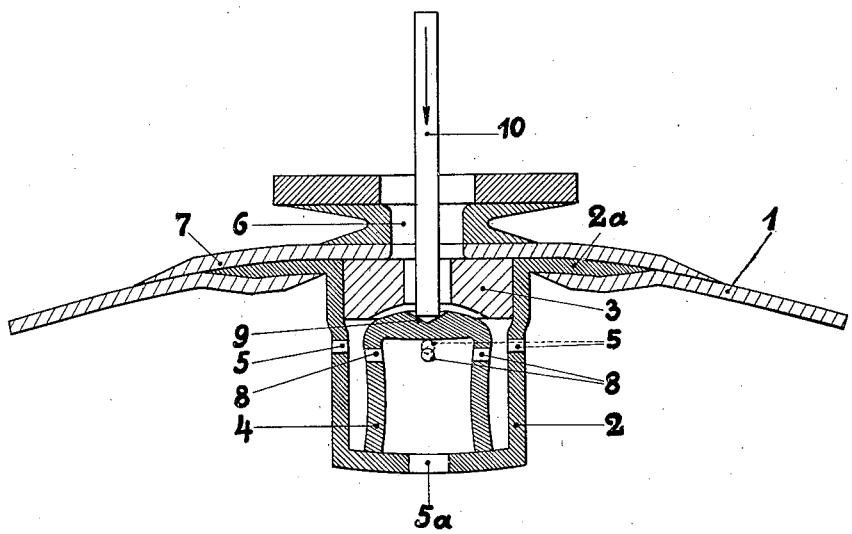
Fig. 2 is a similar view as Fig. 1, showing the air valve in the open position.

The valve mounted on the bladder 1 of the foot-ball consists of a hood-shaped valve case 2 made of soft rubber, of a ring-shaped valve seat 3 of hard rubber aluminium or other suitable material, and of a valve body 4 which is also hood-shaped and made of soft rubber. In the envelope of the valve case 2 passages 5 and in the bottom plate a central opening 5ª are arranged. The valve case 2 is fixed under the charging opening 6 of the bladder 1 and extends into said bladder, the flange 2ª of the top end of the valve case 2 being stuck by means of a rubber solution on the football bladder. The valve seat 3, the outer diameter of which is slightly greater than the inner diameter of the valve case 2, is inserted in the open top end of the valve case 2 so that the wall of said valve case is put under tension and tightly pressed around the valve seat 3. The outwardly directed end face of the valve seat 3 is stuck on the lower surface of a ring-shaped rubber plate 7 which is glued together with the flange 2ª of the valve case and with the bladder 1 of the foot ball. The outer diameter of the valve case 4 is somewhat smaller than the inner diameter of the valve case 2 and the valve body is slightly higher than the distance between the upper surface of the bottom of the valve case and the lower surface of the valve seat 3. In the wall of the valve body 4 four openings 8 are arranged. The valve body 4 is inserted concentric to the valve case 2 into said valve case so that its rim bears on the bottom of the valve case. Owing to its height the closed top end of the valve body 4 is strongly pressed against the valve seat 3 and packs the same. Under the central opening of the valve seat 3 a pointed indentation 9 is arranged in the top face of the valve body and designed to receive the pointed end of a rod 10 (Fig. 2).

At the inflating of the bladder 1 of a football the compressed air flows in through the charging hole 6, slightly compresses the valve body 4 so that its closed top end is moved away from the valve seat 3, and the compressed air can flow through between the valve seat 3 and the valve body 4 into the annular space between said valve body and the valve case 2, through the openings 5 of the valve and the openings 8 of the valve body and the central openings 5ª of the bottom of the valve case into the bladder.

As soon as the forcing in of compressed air is interrupted, the valve body 4 tightly closes again the valve seat 3.

If the compressed air has to be discharged from the bladder 1, a rod 10 is inserted through the charging hole 6 of the bladder 1 and through the central opening of the valve seat 3 into the cavity 9 of the valve body 4 (Fig. 2) so that the valve body is somewhat compressed and moved away from the valve seat, and the compressed air can flow out of the football bladder 1 in the opposite direction to that by which it has entered.

The passage 5ª in the bottom of the valve case 2 is comparatively smaller than the inner diameter of the valve body 4, so that it is impossible that the valve body 4 be pushed through the opening 5ª when the valve body is pushed back by means of the rod 10.

I claim:

1. An air valve for hollow bodies, specially football bladders, comprising in combination the bladder having a charging hole, a hood-shaped valve case of suitable material having several passages in the envelope and a central passage in the bottom plate inserted through said charging hole of said bladder so that it extends into said bladder, a flange at the upper end of said valve case stuck on said bladder, a ring-shaped valve seat of hard material as hard rubber tightly fitted into the open upper end of said valve case, and a hood-shaped valve body of soft rubber having holes in its wall its outer diameter being smaller than the inner diameter of said valve case and its normal height being somewhat greater than the distance between the lower surface of said valve seat and the upper surface of the bottom of said valve case the rim at the open end of said valve body resting on the bottom of said valve case and its closed top end bearing from below against said valve seat tightly sealing the same.

2. An air valve as specified in claim 1, wherein said valve body has at the centre of its closed top end a cavity adapted to receive a rod inserted through said charging hole of said bladder and through the central hole of said valve seat for pushing said valve body away from said valve seat.

3. An air valve as specified in claim 1, said valve case having a central opening in its bottom plate the inner diameter of said opening being smaller than the inner diameter of said valve body.

In testimony whereof I affix my signature.

SIEGFRIED SAUL.